US012670650B2

(12) United States Patent
Rabbani Rankouhi et al.

(10) Patent No.: US 12,670,650 B2
(45) Date of Patent: Jun. 30, 2026

(54) RAY CACHE WITH RAY TRANSFORM SUPPORT FOR RAY TRACING

(71) Applicant: Apple Inc., Cupertino, CA (US)

(72) Inventors: Ali Rabbani Rankouhi, Bushey (GB); David J. Bermingham, Cambridge (GB); Fergus W. MacGarry, Cambridge (GB)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 18/391,260

(22) Filed: Dec. 20, 2023

(65) Prior Publication Data

US 2025/0095264 A1 Mar. 20, 2025

Related U.S. Application Data

(60) Provisional application No. 63/583,928, filed on Sep. 20, 2023.

(51) Int. Cl.
*G06T 15/00* (2011.01)
*G06T 15/06* (2011.01)

(52) U.S. Cl.
CPC ........... *G06T 15/005* (2013.01); *G06T 15/06* (2013.01); *G06T 2210/21* (2013.01); *G06T 2210/52* (2013.01)

(58) Field of Classification Search
CPC ... G06T 15/005; G06T 15/06; G06T 2210/21; G06T 2210/52
See application file for complete search history.

(56) References Cited

U.S. PATENT DOCUMENTS

2015/0170409 A1* 6/2015 He .......................... G06T 15/005
345/426
2020/0051312 A1* 2/2020 Muthler .................. G06T 15/06
(Continued)

FOREIGN PATENT DOCUMENTS

EP 3 965 063 A1 3/2022

OTHER PUBLICATIONS

Antwerpen et al.: Accelerating Boolean Visibility Operations Using RTX Visibility Masks [online] [Retrieved Jul. 29, 2025] <URL: https://link.springer.com/chapter/10.1007/978-1-4842-7185-8_40> (Year: 2021).*

(Continued)

*Primary Examiner* — King Y Poon
*Assistant Examiner* — Vincent Alexander Providence
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to caching data for ray tracing in graphics processors. In some embodiments, ray intersect accelerator circuitry includes traversal circuitry configured to perform intersection tests between rays and bounding regions of an acceleration data structure and transform circuitry configured to, in response to reaching a transform node in the acceleration data structure, transform first coordinates of a ray from a first coordinate space to generate second coordinates of the ray in a second coordinate space. Ray cache circuitry is configured to cache data that is accessible to the ray intersect accelerator circuitry, where an entry of the ray cache circuitry is configured to cache data for the ray that includes: the first coordinates of the ray in the first coordinate space, the second coordinates of the ray in the second coordinate space, and shared data for the ray that applies to both the first and second coordinates.

20 Claims, 10 Drawing Sheets

Example fields of an entry in cache 210

| Ray core 0 (RC0) origin X, Y, Z |
| :---: |
| *402* |

| Ray core 0 direction X, Y, Z components |
| :---: |
| *404* |

| Tmax |
| :---: |
| *408* |

| Visibility mask | Shared flags | Time |
| :---: | :---: | :---: |
| *422* | *424* | *426* |

| RC0 BVH ray state | RC0 flags |
| :---: | :---: |
| *412* | *410* |

| Ray core 1 (RC1) origin X, Y, Z |
| :---: |
| *432* |

| Ray core 1 direction X, Y, Z components |
| :---: |
| *434* |

| RC1 BVH ray state | RC1 flags |
| :---: | :---: |
| *442* | *440* |

• Dashed lines indicate shared fields
• Solid lines indicate non-shared fields

(56)     References Cited

U.S. PATENT DOCUMENTS

| | | | | |
|---|---|---|---|---|
| 2020/0105046 A1* | 4/2020 | Wald | .................... | G06T 15/506 |
| 2021/0390760 A1* | 12/2021 | Muthler | ............... | G06F 9/5027 |
| 2022/0036639 A1* | 2/2022 | Rabbani Rankouhi | ..................... | |
| | | | | G06T 17/005 |
| 2022/0058856 A1 | 2/2022 | Muthler et al. | | |
| 2023/0043630 A1 | 2/2023 | Fielding et al. | | |
| 2023/0073176 A1* | 3/2023 | Livesley | ............... | G06T 15/005 |
| 2023/0084570 A1 | 3/2023 | Muthler et al. | | |

OTHER PUBLICATIONS

Shirley: Ray Tracing: The Next Week [online] [Retrieved Jul. 29, 2025] <URL: https://www.realtimerendering.com/raytracing/Ray% 20Tracing_%20The%20Next%20Week.pdf> (Year: 2018).*
Khronos Group: SPV_KHR_ray_tracing [online] [Retrieved Jul. 29, 2025] <URL: https://github.khronos.org/SPIRV-Registry/ extensions/KHR/SPV_KHR_ray_tracing.html> (Year: 2022).*
Extended European Search Report in Appl. No. 24194860.3 mailed Feb. 14, 2025, 11 pages.

\* cited by examiner

*Processing Flow 100*

Vertex Data

Transform and Lighting *110* → Clip *115* → Rasterize *120* —Pixel Data→ Shade *130* → Frame Buffer *135*

*Graphics Unit 150*

Vertex Pipe *185*

Ray intersect accelerator (RIA) *190*

Programmable Shader *160*

Fragment Pipe *175*

Texture Processing Unit (TPU) *165*

Image Write Buffer *170*

Memory Interface *180*

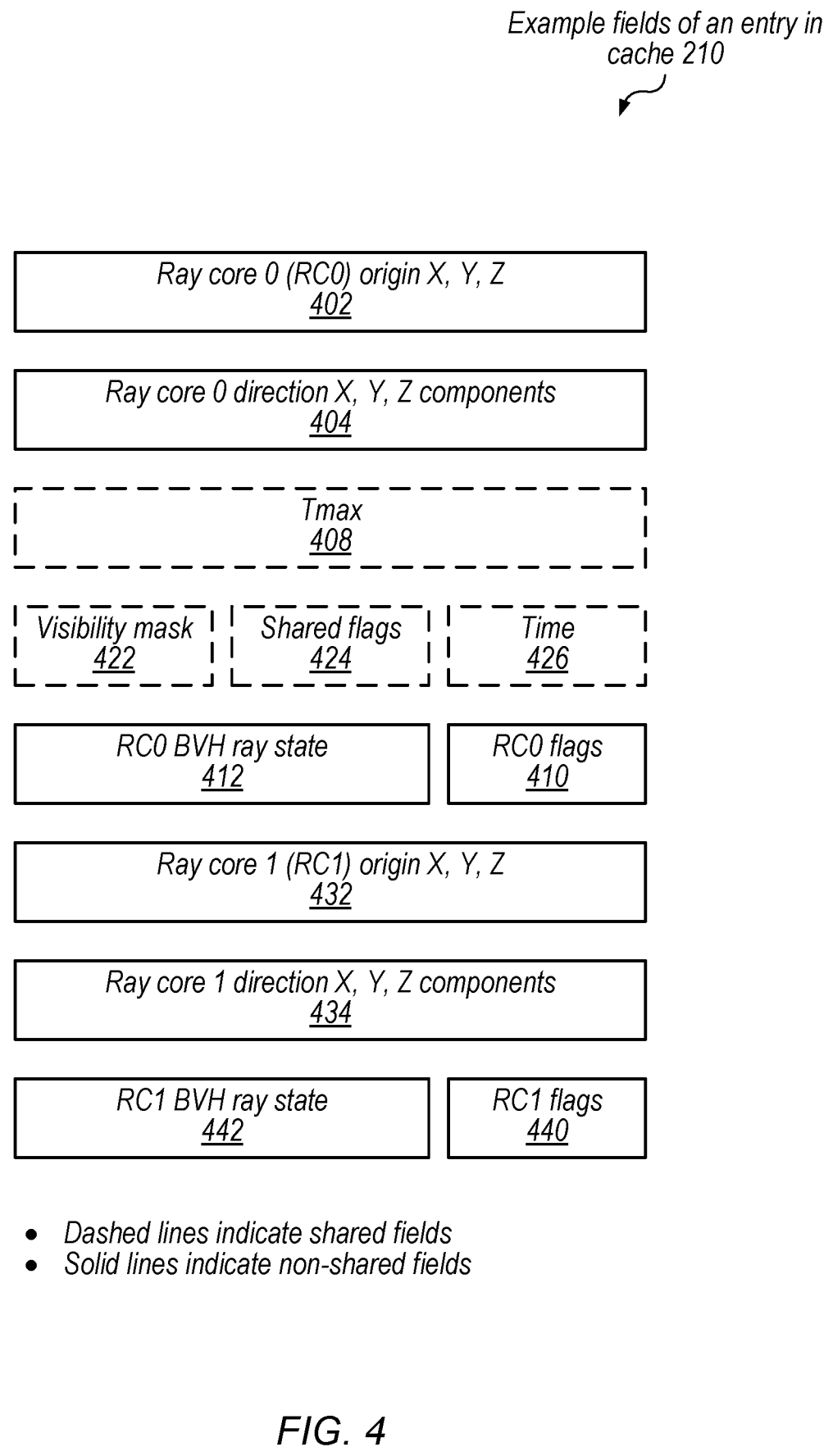

*Example fields of an entry in cache 210*

| Ray core 0 (RC0) origin X, Y, Z |
| :---: |
| *402* |

| Ray core 0 direction X, Y, Z components |
| :---: |
| *404* |

| Tmax |
| :---: |
| *408* |

| Visibility mask | Shared flags | Time |
| :---: | :---: | :---: |
| *422* | *424* | *426* |

| RC0 BVH ray state | RC0 flags |
| :---: | :---: |
| *412* | *410* |

| Ray core 1 (RC1) origin X, Y, Z |
| :---: |
| *432* |

| Ray core 1 direction X, Y, Z components |
| :---: |
| *434* |

| RC1 BVH ray state | RC1 flags |
| :---: | :---: |
| *442* | *440* |

- *Dashed lines indicate shared fields*
- *Solid lines indicate non-shared fields*

*FIG. 4*

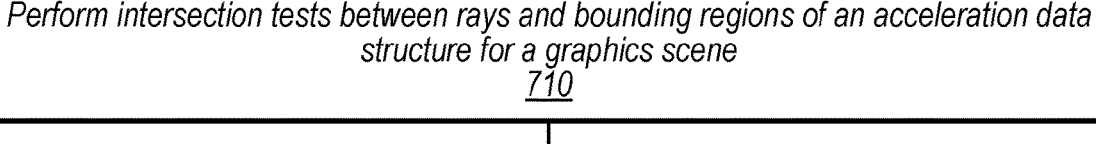

Perform intersection tests between rays and bounding regions of an acceleration data structure for a graphics scene
710

Transform, in response to reaching a transform node in the acceleration data structure, first coordinates of a ray from a first coordinate space to generate second coordinates of the ray in a second coordinate space for subsequent traversal of the acceleration data structure
720

Cache data that is accessible to the ray intersect accelerator circuitry, where an entry of cache circuitry is configured to cache data for the ray that includes:
- the first coordinates of the ray in the first coordinate space
- the second coordinates of the ray in the second coordinate space
- shared data for the ray that applies to both the first and second coordinates
730

*FIG. 7*

RAY CACHE WITH RAY TRANSFORM SUPPORT FOR RAY TRACING

CROSS REFERENCE TO RELATED APPLICATIONS

The present application claims priority to U.S. Provisional App. No. 63/583,928, entitled "Ray Cache with Ray Transform Support for Ray Tracing," filed Sep. 20, 2023, the disclosure of which is incorporated by reference herein in its entirety.

BACKGROUND

Technical Field

This disclosure relates generally to computer graphics processors and more particularly to ray tracing.

Description of Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors (GPUs) that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

In typical ray tracing implementations, the graphics processor traverses a bounding volume hierarchy (BVH) acceleration data structure (ADS) to determine which primitives (e.g., triangles) in a scene are to be tested for intersection with the ray. This substantially reduces the number of ray-primitive intersection tests for a given render (e.g., relative to testing every ray against every primitive).

"Instancing" is a common graphics technique in which parameters for an object or mesh are defined once and then instantiated multiple times in a graphics scene. Rather than including each instance of the object in the ADS for ray tracing, an instanced object typically may have one "instance sub-tree" in the ADS (also referred to as a lower-level BVH that may be reached from a higher-level BVH).

On reaching an instance node (the origin of an instance sub-tree), the GPU may transform the ray from world space to an instance space of a specific instance for further traversal. This may substantially reduce the size of the ADS (relative to replicating the sub-tree at different locations in the ADS for different instances), with the tradeoff that the ray transform may utilize processing resources.

Different GPUs may utilize varying degrees of hardware acceleration for ray tracing tasks. For example, ray intersect acceleration circuitry may be configured to traverse an acceleration data structure by testing for intersection with hierarchically arranged bounding volumes (e.g., boxes) of the BVH to determine a subset of primitives (e.g., triangles) in a graphics scene to be intersection tested. The ray/triangle intersection tests may also be hardware accelerated.

BRIEF DESCRIPTION OF DRAWINGS

FIG. 4 is a diagram illustrating example fields of a ray data cache entry, according to some embodiments.

FIG. 7 is a flow diagram illustrating an example method, according to some embodiments.

DETAILED DESCRIPTION

Disclosed embodiments provide a low-level cache for ray data with various features that may be advantageous in the context of hardware acceleration for ADS traversal operations. In some embodiments, ray intersect accelerator (RIA) circuitry is configured to perform such traversal. Example accelerator circuitry and techniques are discussed in U.S. patent application Ser. No. 17/103,433 titled "Ray Intersect Circuitry with Parallel Ray Testing" and filed Nov. 24, 2020. In some embodiments, the GPU that includes the ray intersect accelerator circuitry also includes transform acceleration circuitry for one or more levels of ray transforms (e.g., when reaching an instance node).

Note that in implementations in which a GPU executes software (e.g., a shader program) to perform ray transforms, a ray data cache may be read-only from the perspective of ray intersect accelerator circuitry. For example, the ray intersect accelerator circuitry may read data from the ray data cache and use the ray data as input to ray/bounding box intersection tests, ray/primitive intersection tests, or both, but may not change the ray data. In contrast, in embodiments with ray transform accelerator circuitry, the accelerator circuitry may write the ray data cache (e.g., to write transformed ray data).

Therefore, in some disclosed embodiments, a low-level ray data cache is accessible only to accelerator hardware and not to shader core circuitry configured to execute shader programs (although ray data may be shared with shader programs using one or more higher-level shared caches). This may allow full ownership of ray data cache entries by the accelerator hardware when in use.

Further, the low-level ray data cache may include entries configured to store a ray pair, e.g., ray data both before and after a ray transform operation. In particular, a given entry may include one or more fields that are specific to an original coordinate space or a transform coordinate space as well as one or more fields that are shared by the ray both before and after transform. Therefore, the ray intersect accelerator circuitry may utilize the appropriate portion of the ray data cache entry depending on the appropriate coordinate space for the current position in the ADS traversal.

When returning to the original coordinate space, the ray intersect accelerator circuitry may transition back to using the portion of the ray data cache entry corresponding to that space. The GPU may also support bypassing the ray transform accelerator circuitry, e.g., to perform a transform using a custom shader. For multi-level instancing, the GPU may alternate between shader ray transforms and accelerated ray transforms.

Various disclosed techniques may improve performance, reduce power consumption, etc. for ray tracing workloads with ray transforms.

Graphics Processing Overview

Figure 1A:
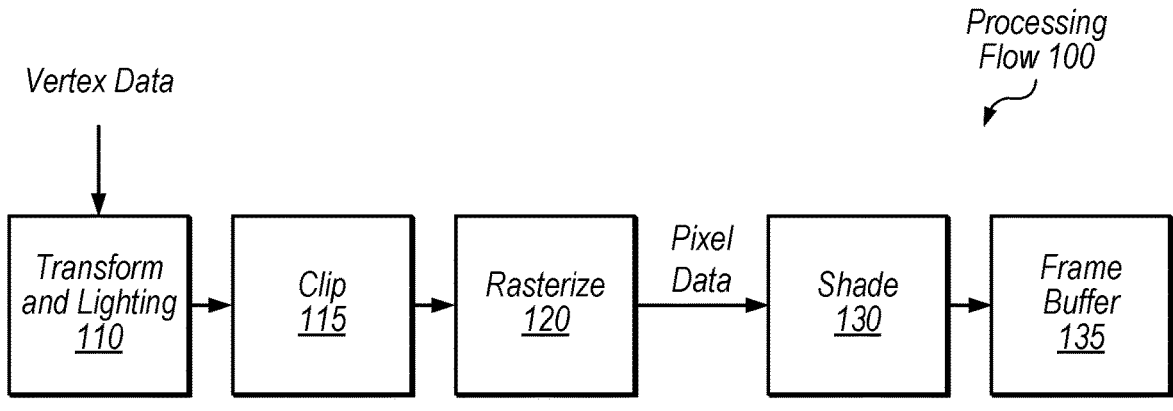
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
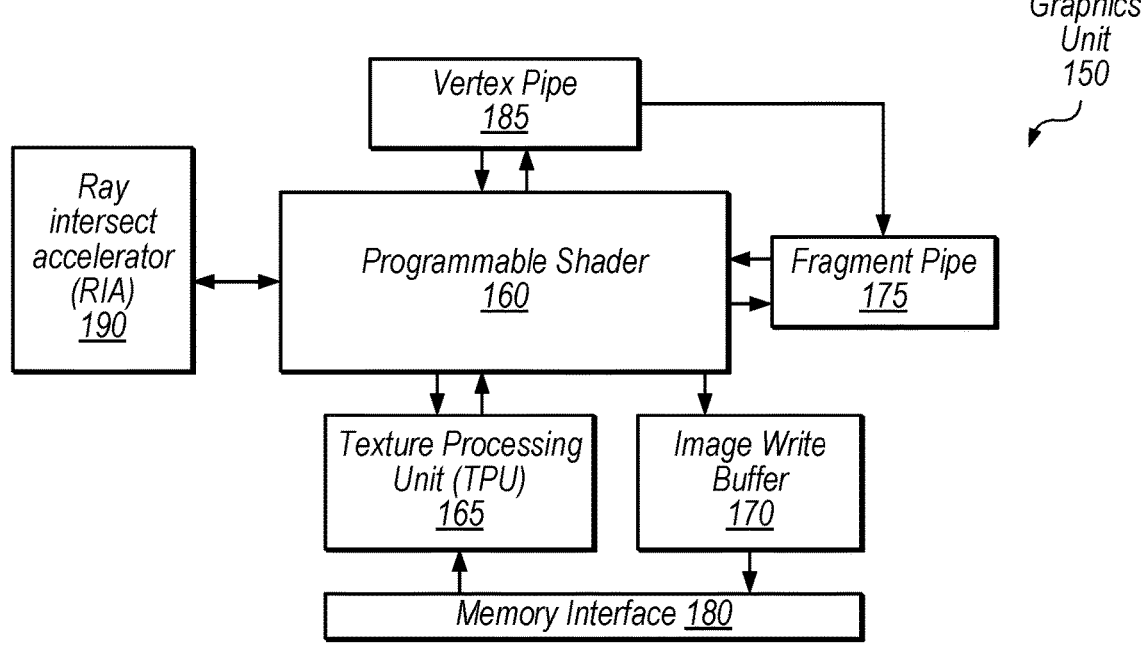
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersect accelerator (RIA) 190, which may include hardware configured to perform various ray intersection operations in response to instruction(s) executed by programmable shader 160, as described in detail below.

Overview of Ray Data Cache for Accelerator Hardware

Figure 2:
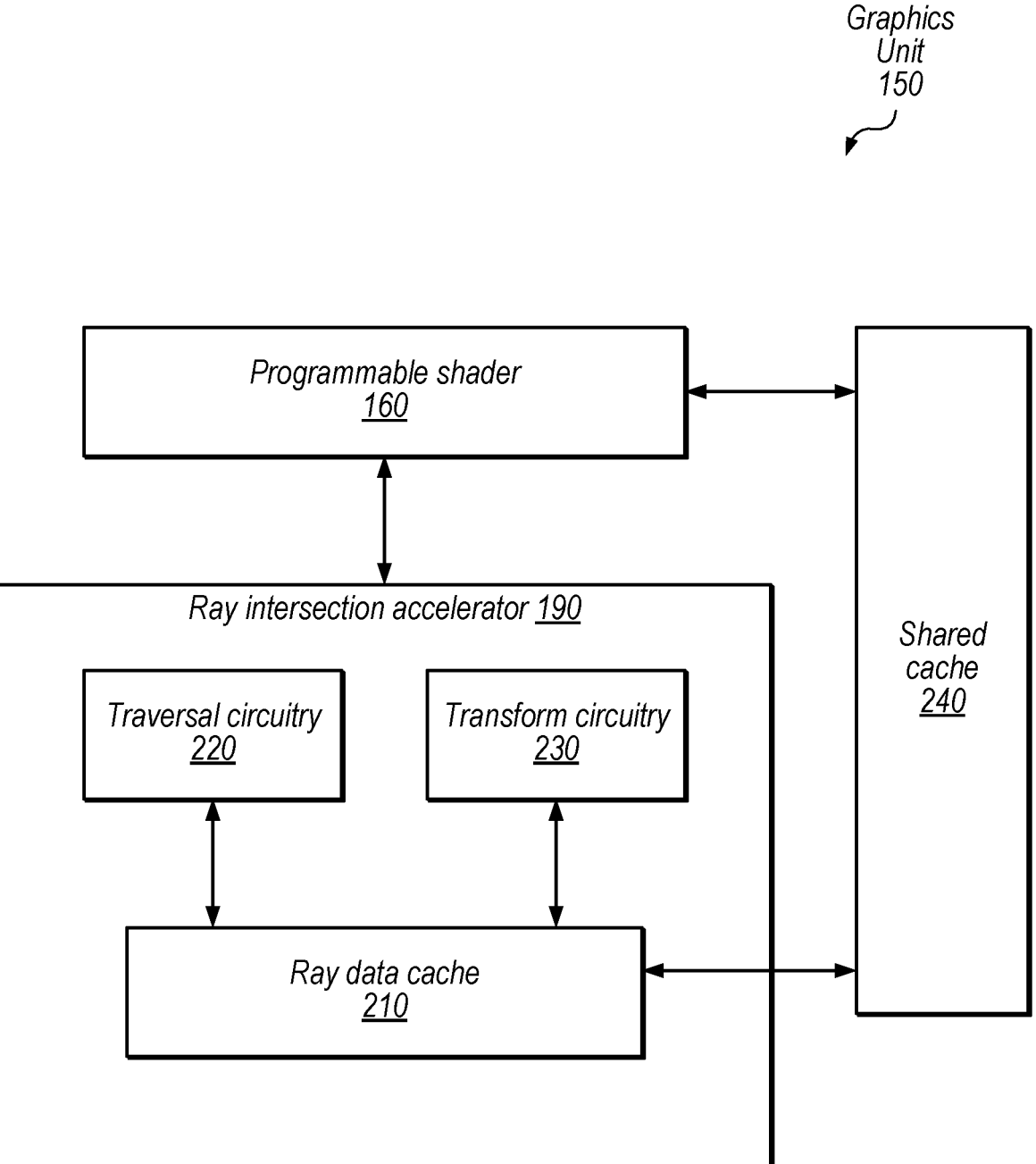
FIG. 2 is a block diagram illustrating an example graphics processor that includes a ray data cache configured to cache data for accelerator hardware, according to some embodiments.

FIG. 2 is a block diagram illustrating an example graphics processor that includes a ray data cache for accelerator hardware, according to some embodiments. In the illustrated example, graphics unit 150 includes programmable shader 160, ray intersect accelerator 190, and shared cache 240.

Ray intersect accelerator 190, in the illustrated embodiment, includes traversal circuitry 220 configured to traverse an ADS e.g., by performing ray/bounding box intersection tests based on an intersect-ray command from programmable shader 160.

Ray intersect accelerator 190 also includes transform circuitry 230 configured to transform ray coordinates, e.g., based on a transform node in the ADS such as an instance node. Note that inclusion of transform accelerator circuitry (in contrast to transforming all ray coordinates by executing a shader program on shader processor 160, for example) may introduce challenges or design decisions relating to caching ray data. For example, the low-level ray data cache of a ray intersect accelerator that does not accelerate ray transforms may be read-only from the accelerator perspective: shaders may write ray data for consumption by the accelerator, but the accelerator may not write ray data. In contrast, transform circuitry 230 generates ray data based on transform operations, which it may store in ray data cache 210.

Therefore, in the disclosed embodiment, ray intersect accelerator 190 is configured to both read and write data in ray data cache 210, which is dedicated to storing ray data in some embodiments. Detailed example fields for a given ray data cache entry are discussed below with reference to FIG. 4. In some embodiments, a given entry in the ray data cache is configured to store data for a ray pair (e.g., a ray in an original coordinate space and a transformed version of the ray in a target coordinate space). This "ray core pair" may be stored using the size of a cache line in shared cache 240, which may simplify cache 210 obtaining exclusive owner-ship of ray data when needed.

In some embodiments, ray data cache 210 is direct mapped and is indexed using ray identifier information for a given ray (although various associativity configurations and access techniques are contemplated, in other embodiments). The ray identifier information may be a hardware identifier that RIA 190 uses internally and may be backed in shader core space, e.g., using a virtual ray identifier.

Shared cache 240, in the illustrated example, is shared by both programmable shader 160 and ray intersect accelerator 190. Therefore, in embodiment in which programmable shader 160 does not have access to ray data cache 210, the graphics unit may write dirty data from ray data cache 210 to shared cache 240 in situations where programmable shader 160 needs to access the data.

In some embodiments, when a ray is in RIA 190, ray data cache 210 has exclusive ownership of ray core state for the ray core pair. For example, graphics unit 150 may drop (e.g., invalidate) or set a last-use indicator for a cache line in shared cache 240 after reading the line into ray data cache 210. When a ray interacts with other circuitry (e.g., a shader program executed by programmable shader 160), RIA 190 may flush the corresponding line from ray data cache 210 to shared cache 240.

Transform circuitry 230, in some embodiments, is con-figured to operate on the following input operands: a ray core 0 origin (e.g., X, Y, and Z coordinates), a ray core 0 direction (e.g., X, Y, and Z components), one or more RIA flag bits, a visibility mask, a forced opacity mode indicator, and winding information (e.g., relating to the handedness of the system in terms of triangle vertex order and ray direc-tion). Some or all of this information may be stored in ray data cache 210, while other information may be stored in the relevant transform node. More details regarding this example information are discussed below with reference to FIG. 4.

In some embodiments, transform circuitry 230 is config-ured to perform a floating-point matrix multiply operation on the ray origin and a transform matrix (e.g., a 4×4 world-to-object matrix for a first-level instance transform) to generate a transformed ray origin. Similarly, transform cir-cuitry 230 may be configured to perform a floating-point matrix multiply operation on the ray direction and the transform matrix. Therefore, transform circuitry may include multiple floating-point multipliers configured to operate in parallel and accumulate circuitry configured to accumulate results of the multiplications to generate a matrix multiply result.

Transform circuitry 230 may output the following trans-form results: ray core 1 origin, ray core 1 direction, ray core 1 Kx/Ky (information associated with normalized ray direc-tion components), ray core 1 flags, a current ray core identifier (e.g., ray core 0 or ray core 1), and updated RIA flags. In this naming convention, ray core 0 refers to the ray state in the original coordinate space and ray core 1 refers to the ray state after the transform.

Note that RIA 190 may perform the following general flow when traversing a lower-level BVH (e.g., an instance sub-tree). First, RIA 190 may perform an instance push that includes reading ray core 0 state from shared cache 240, transforming the ray using transform circuitry 230, and storing the resulting ray core 1 state in an entry of ray data cache 210 with the ray core 0 state. RIA 190 may then continue traversal of the ADS using ray core 1. RIA 190 may then perform an instance pop when transitioning back to the higher-level BVH (e.g., leaving the instance sub-tree). As part of this flow, RIA 190 may write an updated Tmax value to the entry of ray data cache 210.

Figure 3:
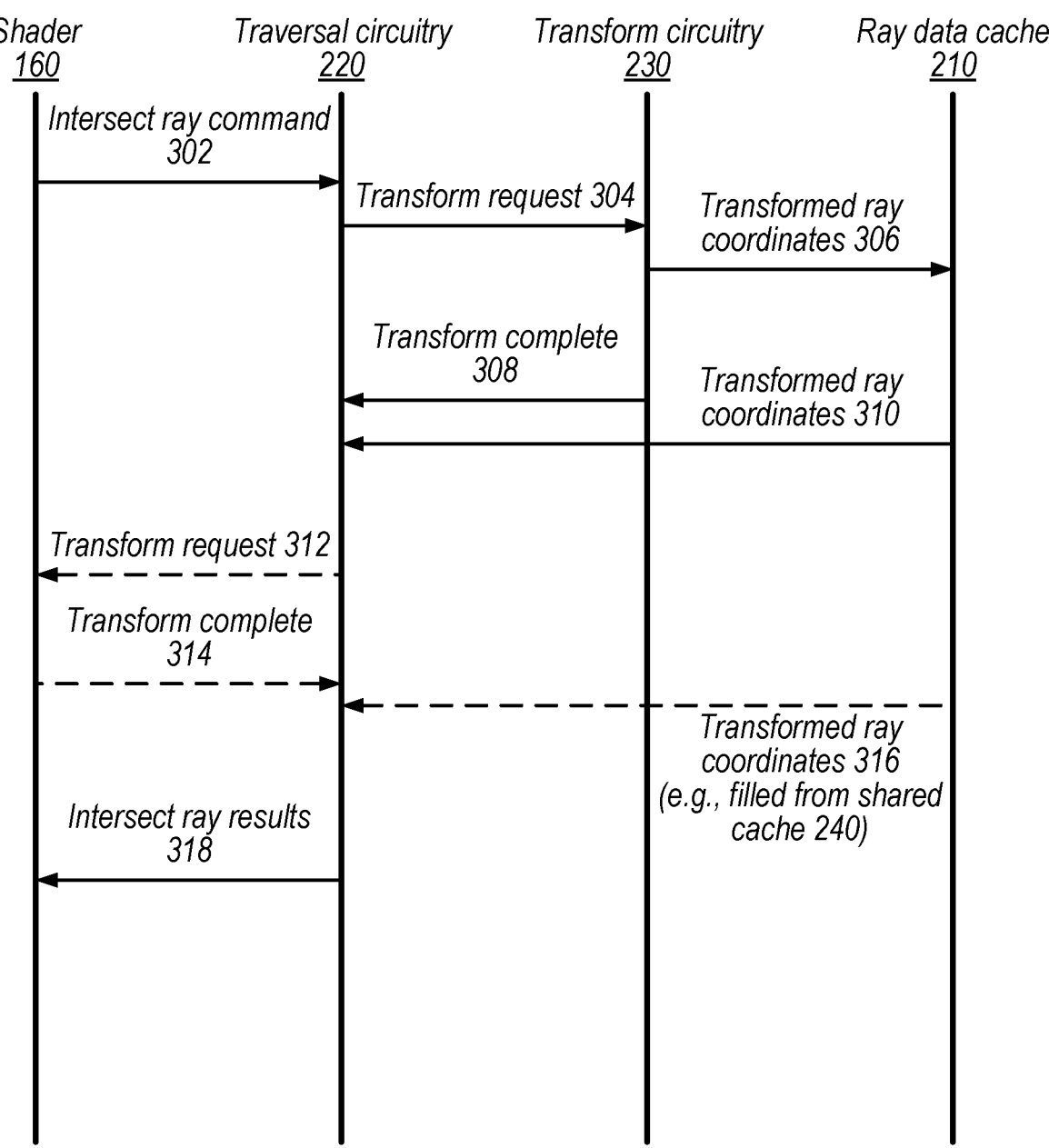
FIG. 3 is a communications diagram illustrating example messages between a shader processor, traversal circuitry, transform circuitry, and the ray data cache, according to some embodiments.

FIG. 3 is a communications diagram illustrating example messages between a shader processor, traversal circuitry, transform circuitry, and a ray data cache, according to some embodiments. In the illustrated example, shader 160 trans-mits an intersect ray command 302 to traversal circuitry 220 based on executing a shader program.

Based on traversal of an ADS in response to the command 302, traversal circuitry 220 sends a transform request 304 to transform circuitry 230. Transform circuitry 230 performs the transform and stores transformed ray coordinates 306 in the ray data cache (and also informs traversal circuitry 220 that the transform is complete in communication 308). In response, traversal circuitry 220 reads the transformed ray coordinates 310 from the ray data cache. Traversal circuitry 220 may utilize the transformed ray coordinates for further traversal and eventually provide traversal results as intersect ray results 318.

FIG. 3 also shows alternative or additional communica-tions for situations where shader 160 performs the transform (shown using dashed lines). In some embodiments, graphics unit 150 supports both shader transform and hardware-accelerated transforms. For example, shader transforms may be performed based on a user-indicated bypass of transform circuitry 230 or based on the current level in a multi-level instancing situation. In this example, traversal circuitry 220 sends transform request 312 to shader 160. Shader 160 indicates when the transform is complete via communication 314. Traversal circuitry 220 then retrieves transformed ray coordinates 316 from ray data cache 210. Note that while shader circuitry 160 may not have access to store data directly in ray data cache 210, shader circuitry 160 may store the data in shared cache 240 and RIA 190 may fill the transformed ray coordinates into the ray data cache 210 from shared cache 240.

In either of the illustrated ray transform situations, tra-versal circuitry may continue traversal of the ADS and provide intersect ray results 318 back to the shader. Note that the continued traversal may include traversal back through the transform/instance node and performing ray/box inter-section tests back in the original coordinate space prior to the transform, using ray core 0 state information.

Example Ray Data Cache Entry Format

FIG. 4 is a diagram illustrating example fields of a ray data cache entry, according to some embodiments. In this example, dashed lines indicate fields that are shared by the ray pair (which includes ray core 0 and ray core 1 in this example) while solid lines indicate non-shared fields.

The fields for ray core 0 (RC0), in the illustrated example, include: origin X, Y, and Z values 402, direction X, Y, and Z components 404, flags 410, and BVH ray state 412. The fields for ray core 1 (RC1) include: origin X, Y, and Z values 432, direction X, Y, and Z components 434, flags 440, and BVH ray state 442.

The origin values and direction components may be stored as floating-point values. The flags 440 may be per-BVH flags (e.g., that may be different for the main BVH than for an instance sub-tree BVH for a given ray) and may include various information, such as cull mode (e.g., none, back, or front), whether early terminate is allowed, Kx and Ky values associated with normalized ray direction compo-nents, winding order (e.g., clockwise or counter-clockwise), and opacity mode (e.g., force opaque, non-opaque forced, of no-forced opacity). The BVH ray state may include various BVH-specific state for a give ray core.

The shared fields, in the illustrated example, include: Tmax 408, visibility mask 422, shared flags 424, and time 426. The Tmax is a ray parametric value that indicates the interval over which the ray is valid (where the interval is a portion of the vector that is defined by the ray origin and direction). Visibility mask 422 may be used to determine when to terminate traversal of part of the ADS (e.g., during a depth-first search). For example, RIA 190 may terminate traversal when visibility mask data for the ray does not match visibility mask data associated with a node of the ADS. Time 426 may be an input for motion blur computations and may be a quantized value.

Shared flags 424, in some embodiments, may include fields such as an indication whether to use ray opacity flags or opacity flags of a portion of the acceleration data structure (e.g., an opacity_none parameter), a ray core identifier that indicates which ray core pair fields to use at the current traversal point, an indication of whether an early termination of the traversal is allowed for the ray, an indication of whether an any any-hit query is being performed for the ray, and an indication whether to process primitives using a shader before moving back to the original coordinate space.

When operating on non-instanced content, RIA 190 may not use all fields of a given line of ray data cache 210 to store ray data and state. Note that ray data may be stored in a shader core memory space, which may store token buffer information, ray core data, ray sideband data, a ray stack, and ray extended data. In some embodiments, graphics firmware may store other ray data (e.g., extended ray data) in ray core 1 fields when instancing is not enabled, e.g., to reduce the footprint of that data in shared cache 240 by including it in cache lines that are otherwise used for ray core data in instancing modes.

Note that while ray core pairs are discussed for purposes of illustration, ray core triplets or greater numbers of ray cores may be stored in a given cache entry in other embodiments, e.g., for multi-level instancing (although this may increase the area of the ray data cache, which may or may not be an advantageous design tradeoff).

Example Bypass and Multi-Level Instancing Techniques

Figure 5:
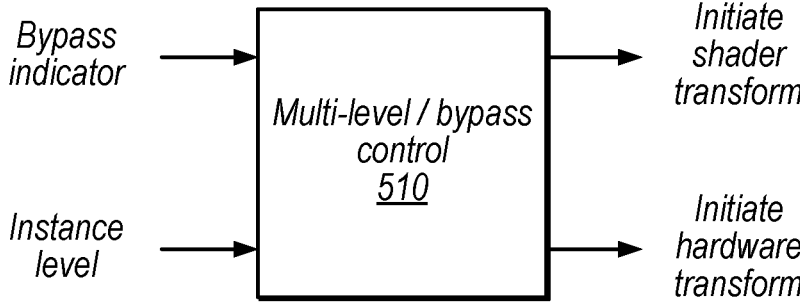
FIG. 5 is a block diagram illustrating example multi-level/bypass control circuitry configured to select a transform procedure, according to some embodiments.

FIG. 5 is a block diagram illustrating example multi-level/bypass control circuitry configured to perform transform selection, according to some embodiments. In the illustrated embodiment, multi-level/bypass control circuitry is configured to receive a bypass indicator signal and an instance level signal. Based on these signals, control circuitry 510 is configured to, for a given ray transform (e.g., based on reaching an instance node), initiate a shader transform (e.g., by a clique-S SIMD group executed on programmable shader 160) or initiate a hardware transform (e.g., by transform circuitry 230).

For example, control circuitry 510 may be configured to always initiate a shader transform when the bypass indicator is set. The bypass indicator may be set by a shader program, for example, and indicate a developer's desire to run a custom shader transform rather than using the hardware transform. A custom shader may allow a shader program to perform level-of-detail selection, for example. The bypass indicator may be stored in a node of the BVH, in some embodiments.

As another example, depending on the number levels of instancing supported by transform circuitry 230, control circuitry 510 may initiate a software shader for an instance level that transform circuitry 230 is not configured to handle. For example, if transform circuitry 230 is configured to handle a single level, control circuitry 510 may alternate back and forth between shader and hardware transforms (e.g., using hardware transforms for every odd-numbered level of instancing). As another example, if transform circuitry 230 is configured to handle two instancing levels, control circuitry 510 may initiate a shader transform every three levels, and so on.

Control circuitry 510 may implement combinational logic configured to perform the disclosed selection operations. For example, the bypass indicator may be an input to an OR gate to the shader transform output such that a shader transform is always initiated if the bypass indicate is set. The instance level may be input to an odd-or-even detector or used to access a lookup table to determine whether to handle the level in hardware or with a shader transform, for example.

In embodiments in which transform circuitry 230 supports transforms for multiple levels of instance transforms, ray data cache 210 may retain ray core data for the current level and the parent level in ray data cache 210. For example, while FIG. 4 shows ray core 0 and ray core 1, other pairs of ray cores may be stored at other times during traversal (e.g., ray core 1 and ray core 2 and so on). The oldest level may be pushed out to retain the current level and parent level in cache 210. When rewinding levels, the system may invalidate the current level and read the parent level from the cache 210, which may reduce reads from a backing cache or memory (e.g., from shared cache 240).

Example Detailed Implementation

Figure 6:
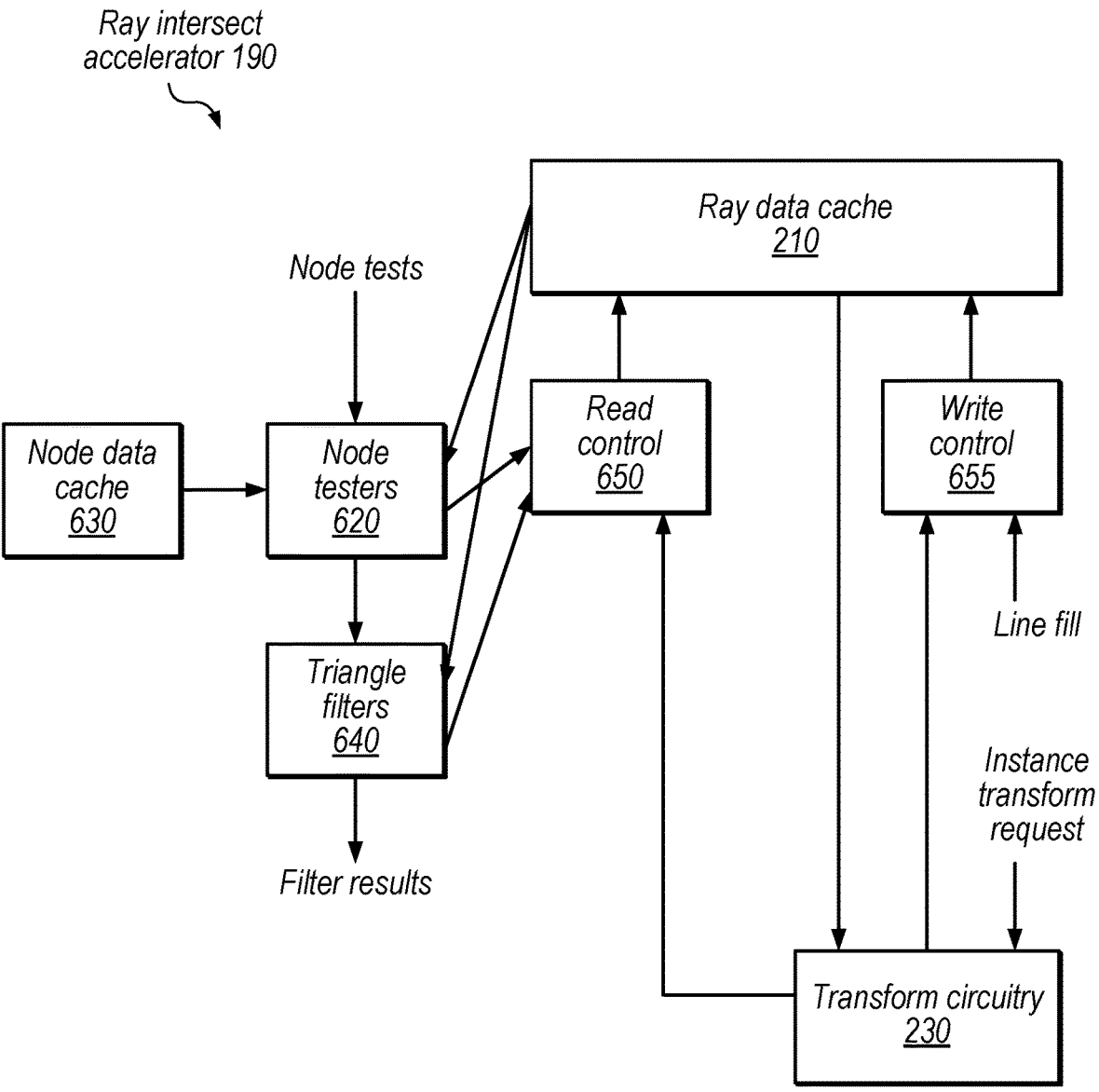
FIG. 6 is a block diagram illustrating example components of a ray intersect accelerator, according to some embodiments.

FIG. 6 is a block diagram illustrating example components of a ray intersect accelerator, according to some embodiments. In the illustrated example, ray intersect accelerator 190 includes ray data cache 210, transform circuitry 230, node testers circuitry 620, node data cache circuitry 630, triangle filters circuitry 640, read control circuitry 650, and write control circuitry 655.

Node testers 620, in the illustrated embodiment are configured to receive node test commands based on ADS traversal. Testers 620 may be configured to perform bounding box tests for all children of a given ADS node in parallel, for example. Testers 620 may implement a conservative slab test for bounding boxes, for example. In the illustrated example, node testers 620 receive input for ray/bounding box intersection tests from node data cache 630 and ray data cache 210.

As shown, intersection results for certain nodes (e.g., hits in primitive leaf nodes) are provided to triangle filters 640, which may perform reduced-precision ray/primitive intersect tests (e.g., to determine that there is not a hit for some tests, avoiding a need to perform a full-precision intersection test). The filter results may be used to determine which primitive should receive a full-precision intersection test, by hardware or a shader.

Read control 650, in the illustrated embodiment, is configured to read data from ray data cache 210 based on requests from node testers 620 and triangle filters 640. As shown, transform circuitry 230 is also configured to request reads, e.g., of ray core 0 state information to be used to perform a transform and generate ray core 1 state information, which transform circuitry 230 then writes to ray data cache 210 by interacting with write control circuitry 655. Note that transform circuitry 230 may receive an instance transform request in response to RIA 190 determining to traverse to an instance node. A given node in the ADS may include a set of bounds for its child nodes, origin information for a quantization frame for the child bounds, metadata for child bounds (e.g., that indicates whether a child node is an instance node), state information, etc.

Write control 655, in some embodiments, in addition to writing ray core 1 data from transform circuitry 230 may also retrieve ray core 0 data (e.g., from shared cache 240) and write the data to ray data cache 210 as a line fill. Once ray core 1 data is written to ray data cache 210, it is available for instance sub-tree traversal, including node tests by node testers 620.

Example Method

FIG. 7 is a flow diagram illustrating an example method, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a graphics processor (e.g., RIA 190) performs intersection tests (e.g., using traversal circuitry 220) between rays and bounding regions of an acceleration data structure for a graphics scene.

At 720, in the illustrated embodiment, the graphics processor (e.g., using transform circuitry 230) transforms, in response to reaching a transform node in the acceleration data structure, first coordinates of a ray from a first coordinate space to generate second coordinates of the ray in a second coordinate space for subsequent traversal of the acceleration data structure. In some embodiments, the transform node is an instance node. For a first-level instance, the first coordinates of the ray are in a world space and the second coordinates of the ray are in an instance space. In some embodiments, transform circuitry is configured to use the second coordinates for traversal subsequent to the transform node and transition back to use of the first coordinates after traversing back through the transform node during a depth-first traversal.

In some embodiments, the acceleration data structure includes nested transforms and the graphics processor is configured to: use the transform circuitry and an entry of the ray cache circuitry to handle a first transform level of the nested transforms and use the shader processor circuitry to handle a second transform level of the nested transforms. In some embodiments, ray intersect accelerator circuitry is configured to, in response to reaching the transform node and a bypass indicator, initiate one or more threads on the shader processor circuitry to perform the transform instead of using the transform circuitry to perform the transform.

At 730, in the illustrated embodiment, the graphics processor caches (e.g., ray data cache 210) data that is accessible to the ray intersect accelerator circuitry, where an entry of the cache is configured to cache data for the ray that includes: the first coordinates of the ray in the first coordinate space, the second coordinates of the ray in the second coordinate space, and shared data for the ray that applies to both the first and second coordinates.

In some embodiments, the shared data includes one or more of the following: visibility mask data (where the ray intersect accelerator circuitry is configured to terminate traversal of a portion of the acceleration data structure in response to determining that the visibility mask data for the ray does not match visibility mask data associated with the portion of the acceleration data structure), a quantized ray timestamp value, an indication whether to process primitives using a shader before transforming coordinates of the ray back to the first coordinate space, a tmax value that indicates bounds of a parametric interval for the ray, an indication of whether any any-hit query is being performed for the ray, an indication of whether an early termination of the traversal is allowed for the ray, an indication whether to use ray opacity flags or opacity flags of a portion of the acceleration data structure, and an identifier of whether the first coordinates or the second coordinates are being used at a current traversal point for the ray.

In some embodiments, the graphics processor includes shader processor circuitry configured to execute graphics programs and the cache is not accessible to the shader processor circuitry, but is included in a cache/memory hierarchy that includes at least one higher-level cache (e.g., shared cache 240) that is accessible to the shader processor circuitry.

In some embodiments, an entry of the cache is further configured to cache data for the ray that includes one or more of: first flag data corresponding to the first coordinates and second flag data corresponding to the second coordinates.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 8:
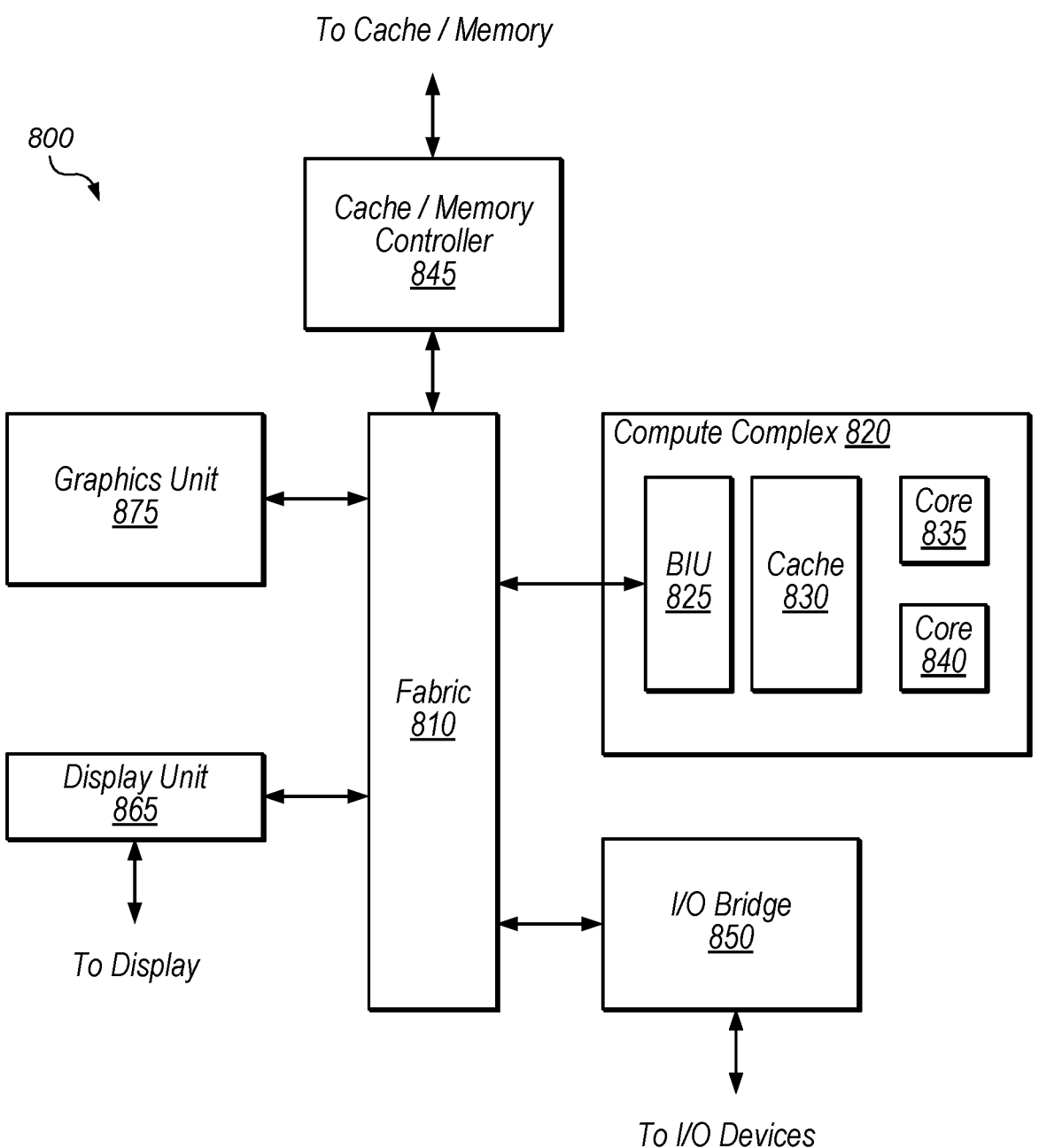
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve performance, reduce power consumption, or both for ray tracing workloads executed by graphics unit 875.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
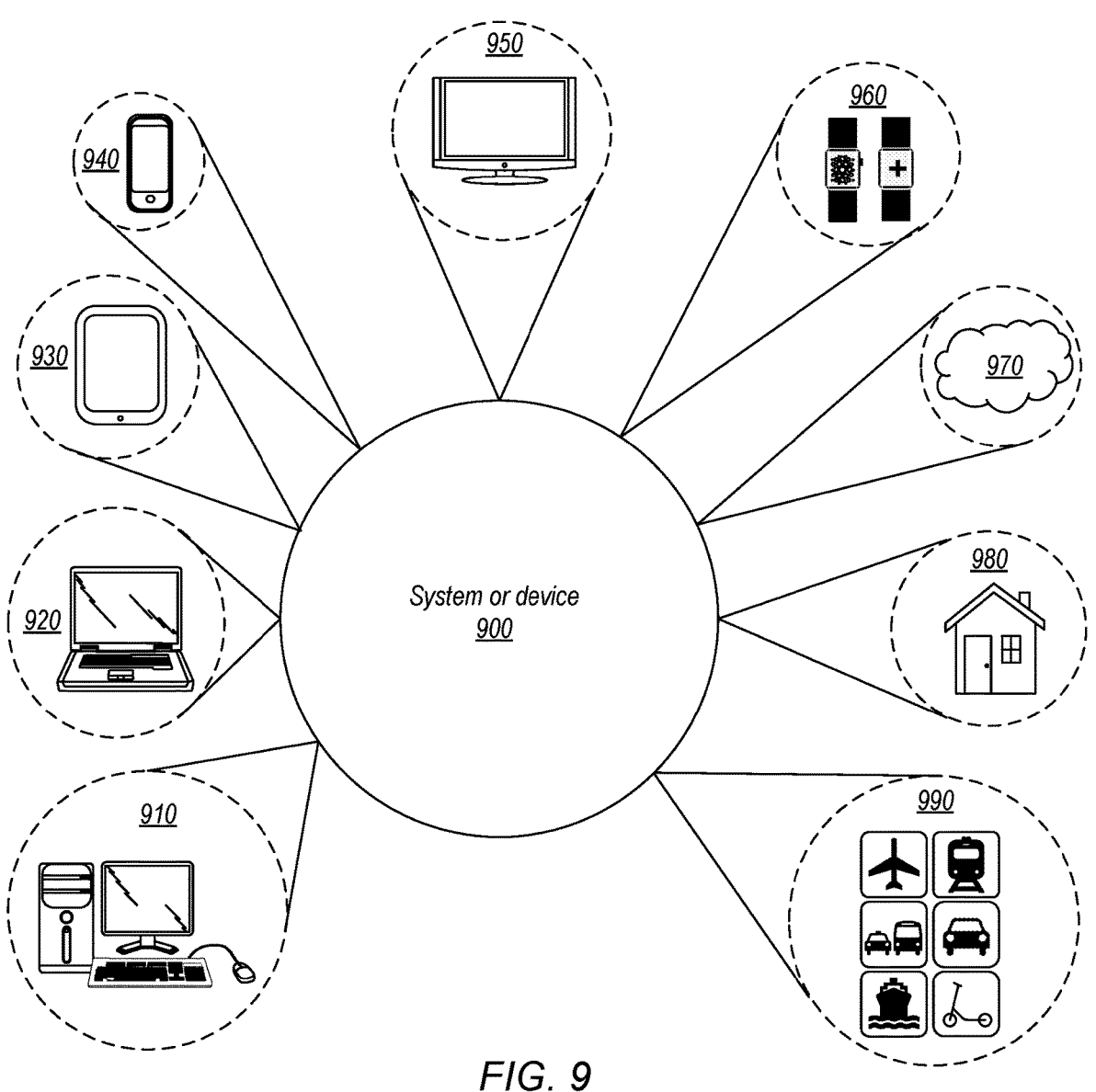
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized every-day devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
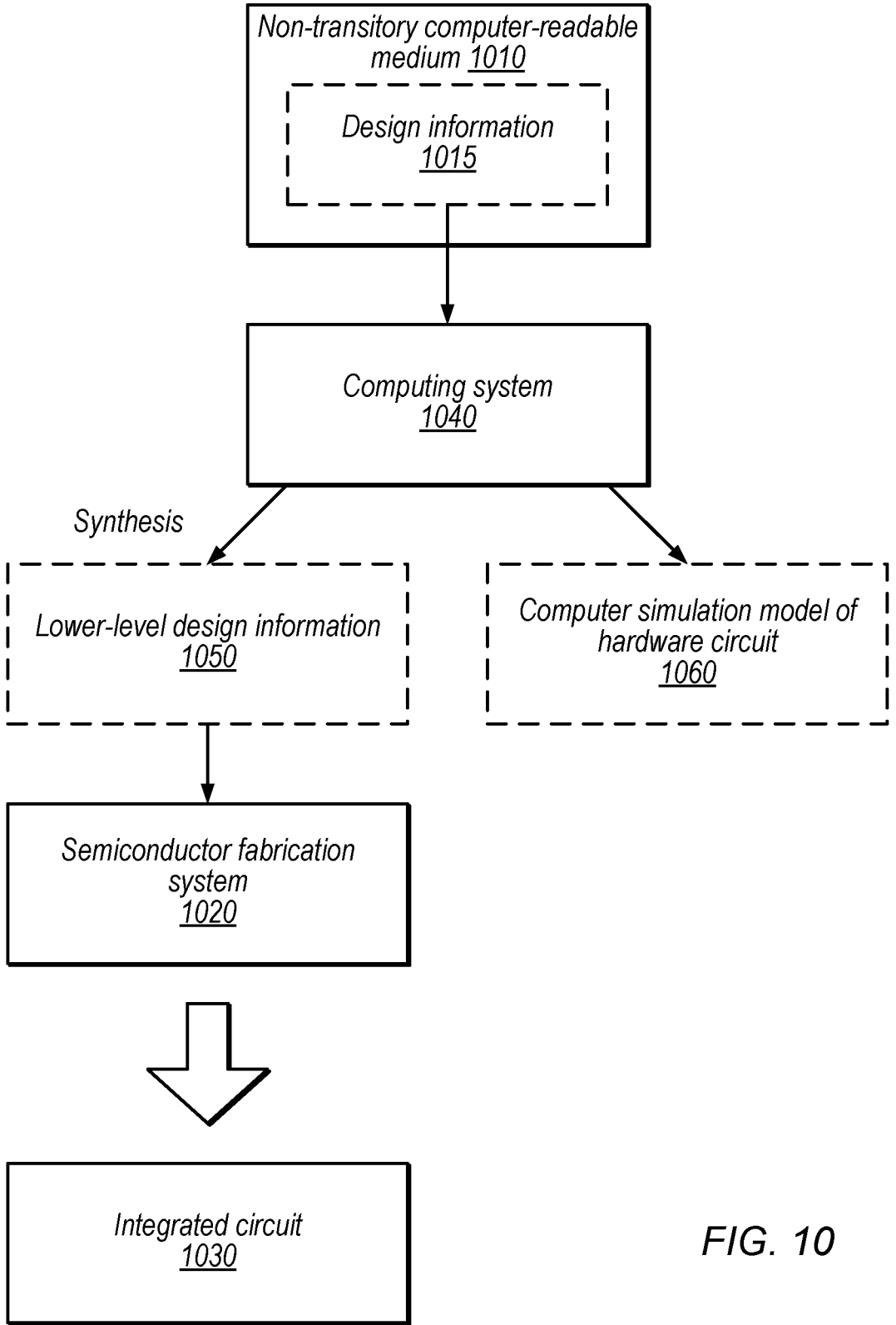
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments.

In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1B, 2, 5-6, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations.

It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
shader processor circuitry configured to execute graphics programs;
ray intersect accelerator circuitry that includes:
traversal circuitry configured to perform intersection tests between rays and bounding regions of an acceleration data structure for a graphics scene; and
transform circuitry configured to, in response to reaching a transform node in the acceleration data structure, transform first coordinates of a ray from a first coordinate space to generate second coordinates of the ray in a second coordinate space for subsequent traversal of the acceleration data structure; and
ray cache circuitry configured to cache data that is accessible to the ray intersect accelerator circuitry, wherein an entry of the ray cache circuitry is configured to cache data for the ray that includes:
the first coordinates of the ray in the first coordinate space;
the second coordinates of the ray in the second coordinate space; and
shared data for the ray that applies to both the first and second coordinates.

2. The apparatus of claim 1, wherein the shared data includes:
visibility mask data, wherein the ray intersect accelerator circuitry is configured to terminate traversal of a portion of the acceleration data structure in response to determining that the visibility mask data for the ray does not match visibility mask data associated with the portion of the acceleration data structure.

3. The apparatus of claim 1, wherein the shared data includes:
a quantized ray timestamp value;
an indication whether to process primitives using a shader before transforming coordinates of the ray back to the first coordinate space;
a tmax value that indicates bounds of a parametric interval for the ray;
an indication of whether an any-hit query is being performed for the ray;
an indication of whether an early termination of the traversal is allowed for the ray;
an indication whether to use ray opacity flags or opacity flags of a portion of the acceleration data structure; and
an identifier of whether the first coordinates or the second coordinates are being used at a current traversal point for the ray.

4. The apparatus of claim 1, wherein:
the ray cache circuitry is not accessible to the shader processor circuitry; and
the ray cache circuitry is included in a cache/memory hierarchy that includes at least one higher-level cache that is accessible to the shader processor circuitry.

5. The apparatus of claim 1, wherein:
the transform node is an instance node;
the first coordinates of the ray are in a world space; and
the second coordinates of the ray are in an instance space.

6. The apparatus of claim 1, wherein the entry of the ray cache circuitry is further configured to cache data for the ray that includes:
first flag data corresponding to the first coordinates; and
second flag data corresponding to the second coordinates.

7. The apparatus of claim 1, wherein the traversal circuitry is configured to use the second coordinates for traversal subsequent to the transform node and transition back to use of the first coordinates after traversing back through the transform node during a depth-first traversal.

8. The apparatus of claim 1, wherein the acceleration data structure includes nested transforms and the apparatus is configured to:
use the transform circuitry and the entry of the ray cache circuitry to handle a first transform level of the nested transforms; and
use the shader processor circuitry to handle a second transform level of the nested transforms.

9. The apparatus of claim 1, wherein the ray intersect accelerator circuitry is configured to, in response to reaching the transform node and a bypass indicator, initiate one or more threads on the shader processor circuitry to perform the transform instead of using the transform circuitry to perform the transform.

10. The apparatus of claim 1, wherein the acceleration data structure includes nested transforms and the apparatus is configured to:

use the transform circuitry to handle multiple nested transforms; and maintain in the ray cache circuitry, for a given transform level, a pair of coordinates of the ray corresponding to a current level and a parent level.

11. The apparatus of claim 1, wherein the apparatus is a computing device that further includes:

a central processing unit;

a display; and network interface circuitry.

12. A method, comprising:

performing, by a graphics processor, intersection tests between rays and bounding regions of an acceleration data structure for a graphics scene;

transforming, by the graphics processor in response to reaching a transform node in the acceleration data structure, first coordinates of a ray from a first coordinate space to generate second coordinates of the ray in a second coordinate space for subsequent traversal of the acceleration data structure; and caching, by the graphics processor in an entry of a ray cache, ray data for the intersection tests, including:

the first coordinates of the ray in the first coordinate space;

the second coordinates of the ray in the second coordinate space; and shared data for the ray that applies to both the first and second coordinates.

13. The method of claim 12, wherein the shared data includes:

a tmax value that indicates bounds of a parametric interval for the ray;

an indication of whether an any-hit query is being performed for the ray; and an identifier of whether the first coordinates or the second coordinates are being used at a current traversal point for the ray.

14. The method of claim 12, wherein the cached ray data in the entry further includes:

first flag data corresponding to the first coordinates; and second flag data corresponding to the second coordinates.

15. The method of claim 12, further comprising:

determining whether to use hardware transform circuitry or a shader transform for the transforming based on a bypass indicator.

16. A non-transitory computer-readable medium having instructions of a hardware description programming language stored thereon that, when processed by a computing system, program the computing system to generate a computer simulation model, wherein the model represents a hardware circuit that includes:

shader processor circuitry configured to execute graphics programs;

ray intersect accelerator circuitry that includes:

traversal circuitry configured to perform intersection tests between rays and bounding regions of an acceleration data structure for a graphics scene; and transform circuitry configured to, in response to reaching a transform node in the acceleration data structure, transform first coordinates of a ray from a first coordinate space to generate second coordinates of the ray in a second coordinate space for subsequent traversal of the acceleration data structure; and ray cache circuitry configured to cache data that is accessible to the ray intersect accelerator circuitry, wherein an entry of the ray cache circuitry is configured to cache data for the ray that includes:

the first coordinates of the ray in the first coordinate space;

the second coordinates of the ray in the second coordinate space; and shared data for the ray that applies to both the first and second coordinates.

17. The non-transitory computer-readable medium of claim 16, wherein the shared data includes:

visibility mask data, wherein the ray intersect accelerator circuitry is configured to terminate traversal of a portion of the acceleration data structure in response to determining that the visibility mask data for the ray does not match visibility mask data associated with the portion of the acceleration data structure.

18. The non-transitory computer-readable medium of claim 16, wherein the shared data includes:

a tmax value that indicates bounds of a parametric interval for the ray;

an indication of whether an any-hit query is being performed for the ray; and an identifier of whether the first coordinates or the second coordinates are being used at a current traversal point for the ray.

19. The non-transitory computer-readable medium of claim 16, wherein:

the ray cache circuitry is not accessible to the shader processor circuitry; and the ray cache circuitry is included in a cache/memory hierarchy that includes at least one higher-level cache that is accessible to the shader processor circuitry.

20. The non-transitory computer-readable medium of claim 16, wherein the traversal circuitry is configured to use the second coordinates for traversal subsequent to the transform node and transition back to use of the first coordinates after traversing back through the transform node during a depth-first traversal.

* * * * *